March 15, 1966  G. R. KNIGHT, JR  3,240,363
APPARATUS FOR LOADING, STOWING AND
TRANSPORTING LAND VEHICLES Filed April 23, 1963  5 Sheets-Sheet 1

INVENTOR
GEORGE R. KNIGHT, JR.

BY *Stevens, Davis, Miller & Mosher*
ATTORNEYS

March 15, 1966  G. R. KNIGHT, JR  3,240,363
APPARATUS FOR LOADING, STOWING AND
TRANSPORTING LAND VEHICLES
Filed April 23, 1963  5 Sheets-Sheet 2

INVENTOR
GEORGE R. KNIGHT, JR.

BY
Stevens, Davis, Miller & Mosher
ATTORNEYS

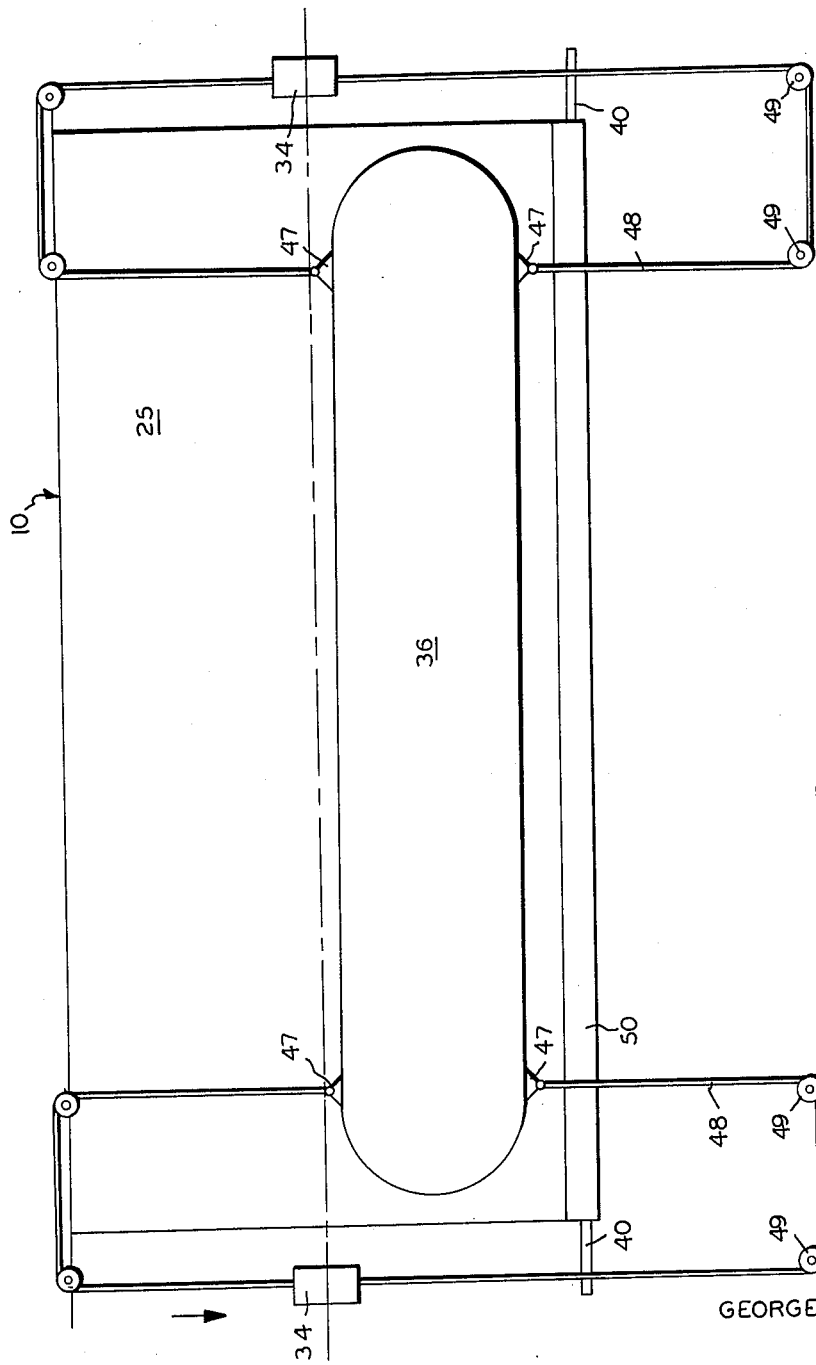

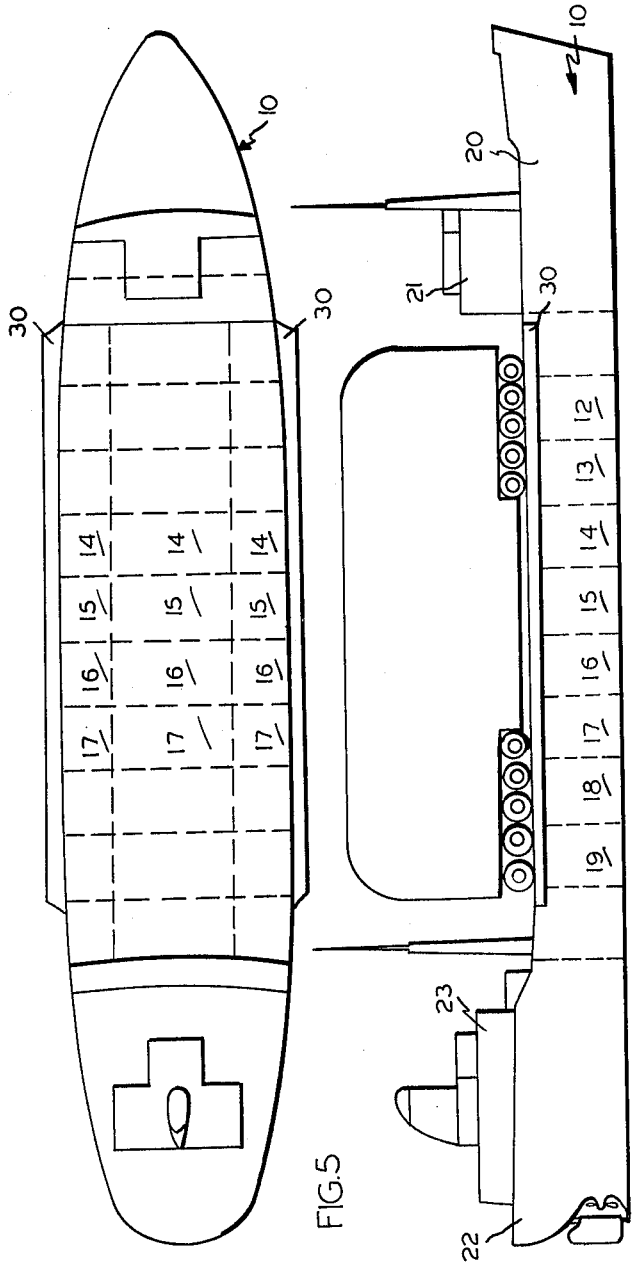

March 15, 1966  G. R. KNIGHT, JR  3,240,363
APPARATUS FOR LOADING, STOWING AND
TRANSPORTING LAND VEHICLES Filed April 23, 1963  5 Sheets-Sheet 5

INVENTOR.
GEORGE R. KNIGHT, JR.
BY
Stevens, Davis, Miller & Mosher
ATTORNEYS

United States Patent Office
3,240,363
Patented Mar. 15, 1966

3,240,363
APPARATUS FOR LOADING, STOWING AND TRANSPORTING LAND VEHICLES
George R. Knight, Jr., Port Washington, N.Y., assignor to John J. McMullen Associates, Inc., New York, N.Y., a corporation of New York
Filed Apr. 23, 1963, Ser. No. 275,042
7 Claims. (Cl. 214—14)

The present invention relates to a method and apparatus for loading and stowing vehicles and transporting them from one place to another.

The present invention also relates to a tanker ship and the like having means thereon for towing a large land vehicle and a method of loading and unloading the land vehicle onto and from the ship.

At the present time it is common practice to take a conventional trailer truck and pull it along side of a dockside and load it by lifting it by crane upon a ship for transportation by sea to another place. Thereafter the trailer truck is lifted off of the ship and hooked to a cab and transported to a local destination. This presents no problem as the trailers are conventional land vehicles and can be handled by readily available equipment and the trailer vehicle may weigh in the neighborhood of 20 tons or 30 tons at most since there are regulations against utilizing existing highways with a vehicle above a maximum weight. However, with the advance of the so-called space age in which a vehicle or missile is utilized to place a so-called package in space such as military weapons, weather satellites, and communication satellites, including television devices, present transportation equipment and apparatus is not sufficient to transport and deliver the vehicle from its place of manufacture and fabrication to the launching site.

One reason for this is that these vehicles may have a weight of approximately five hundred thousand pounds and be thirty-three feet in diameter and one hundred and seventy-five feet long. Another vehicle in mind has a weight of approximately six hundred thousand pounds, is sixty feet in diameter and one hundred and fifty feet long. Thus, from these examples it is obvious that the overall height of the vehicles and the length thereof and the weight present problems of transportation.

In accordance with the present invention a ship is provided for transporting and carrying such a vehicle from one place to another and is provided with means that facilitate the loading and unloading of the heavy and large vehicles.

It is an object of the present invention to provide a tanker ship and the like with means thereon for stowing large land vehicles of heavy weight to transport them from one place to another.

It is another object of the present invention to provide a tanker ship and the like with means that cooperate with land facilities such as a dockside to enable easy loading and unloading of a heavy and large vehicle disposed on a trailer-type platform so that the vehicle and its platform may be hauled from the manufacturing plant and loaded on the ship and thereafter transported by water to its destination after which it is again unloaded from the ship onto the land and moved to its final destination.

It is another object of the present invention to provide a tanker ship and the like with a platform means thereon for stowing a heavy land vehicle without interfering with the normal functions and operation of the ship.

It is another object of the present invention to provide a tanker ship having sponson means formed integral therewith for facilitating loading and unloading of a heavy land vehicle onto the ship and which sponson means can be readily disposed on ships now in existence.

It is another object of the present invention to provide a tanker ship and the like with platform means for stowing a large and heavy land vehicle thereon with sponson means that cooperate with other means disposed on a dockside so that the vehicle may be readily loaded and unloaded from the ship.

It is another object of the present invention to provide a tanker ship and means thereon cooperating with dockside means which enable the loading and unloading of a large and heavy land vehicle onto the ship from the side of the ship which does not require a substantial re-arrangement of the vessel accommodations and structure, as commonly occurs when a ship is outfitted to carry a large land vehicle which is loaded and unloaded therefrom from the bow or stern of the ship.

It is another object of the present invention to provide a method of loading and unloading a heavy land vehicle upon a seagoing ship with sponson means and other cooperating means so that the ship can be kept on an even keel and trim during the loading and unloading operation.

It is another object of the present invention to provide a ship with sponson means disposed thereon and a platform for stowing and carrying large and heavy land vehicles thereon in which the ship and dockside are provided with cooperating means that permit the ship to be made fast to the pier or dockside in such a way that it will rotate or pivot about its sponson means in response to changes of weight and buoyant forces, and will not rise or fall with relation to the pier.

It is another object of the present invention to provide a tanker ship and the like with means disposed thereon to enable a ship to be made fast to the pier in such a way that it will eliminate any possibility of significant misalignment of the platform means on the ship for carrying the land vehicle with respect to the level of the dockside from which the land vehicle is loaded.

It is another object of the present invention to provide an apparatus for transporting a heavy and large land vehicle from one destination to another by sea and thereafter unloading it in which the normal ballast facilities of the ship are utilized in the operation, and the conventional winch means of the ship are also utilized thereby requiring no auxiliary equipment in such an operation.

It is another object of the present invention to provide a method for loading and unloading a large and heavy land vehicle from a dockside or pier to a seagoing ship for transportation to its destination by rolling the vehicle sideways onto and off the ship which can be accomplished by existing winch facilities and which only permits rotation or pivoting of the ship at a point contiguous to the dockside so that the dockside level and the ship platform level upon which the vehicle is to be disposed cannot become misaligned with one another.

Various other objects and advantages of the present invention will be readily apparent from the following detailed description when considered in connection with the accompanying drawings forming a part thereof and in which:

FIGURE 3 is a view similar to FIGURE 2 but in plan;

FIGURE 4 is a diagrammatic side view of the ship embodied in the present invention showing the location of the ballasting means therein;

FIGURE 5 is a view similar to FIGURE 4 but taken in plane showing the ballasting means utilized in loading and unloading the heavy land vehicle on a ship;

Figure 1:
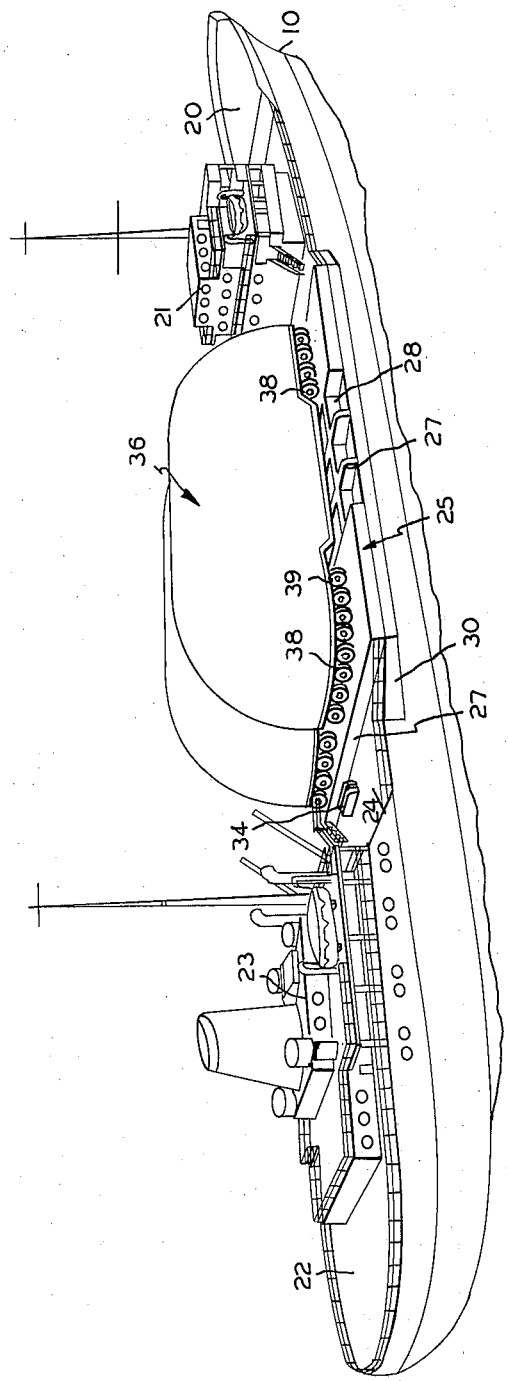
FIGURE 1 is a perspective view of a tanker ship in which the present invention is embodied shown carrying a large heavy land vehicle thereon.

Referring to the drawings, the reference numeral 10 generally designates a slightly modified tanker ship of conventional configuration and known in the shipping field as a "T2 Tanker." The tanker, of course, transports liquid such as hydrocarbon oils and aviation gasoline and the like from one destination or port to another.

Referring now to FIGURES 4 and 5 the hull of the ship is provided with a plurality of large tanks designated 12 to 19 inclusive, for carrying the oil or other liquid cargo. These tanks are filled with salt or sea water as ballast when they have discharged their liquid cargo so that the ship will not ride high in the water but will have stability and an even trim as it runs through the water. The tanks adjacent the central portion or amid ship of the hull generally comprise three tanks disposed abreast of one another and transversely of the hull, including a large main central tank and a narrower tank on the starboard and port side of each center tank. The bow 20 of the ship is provided with a forward control bridge house 21 while the stern of the ship 22 is provided with a rear or aft bridge house 23, as best shown in FIGURE 1. The amidship or central portion of the ship between the bow and stern designated 24 includes a large horizontally extending portion or main deck and the valves, piping and pumps for filling the oil tanks and discharging oil therefrom, and filling them with salt water ballast are disposed on this horizontal portion. However, for purposes of clarity they have been omitted from the drawings.

In accordance with the present invention a platform 25 is provided on the ship which extends above the main deck 24. The platform 25 extends longitudinally of the ship from a point adjacent the tank 19 to a point adjacent the tank 13 as shown in FIGURE 4. The platform 25 consists of horizontal plate members 26 which form the roadway upon which the wheels of the land vehicle are disposed, and which roadway may be of solid plates or made of grated plates so that light may enter the space beneath the platform. The roadway 26 is supported by a plurality of transversely and longitudinally extending vertical structural members 27 and 28, respectively secured to one another and to the top of the main deck as best shown in FIGURE 1. These structural members or bulkheads are of sufficient height so as to allow the normal functioning of the piping and valves and other equipment located on the main deck for filling and discharging liquid from the tank. The platform 26 extends transversely of the ship beyond the opposite sides of the hull and overhangs the ship. The portions of the platform 26 which extend beyond the opposite sides of the hull are supported on sponsons 30.

The sponsons 30 are substantially horizontal structural members extending longitudinally along both sides of the hull and secured to the outer wall or side of the hull.

Figure 2:
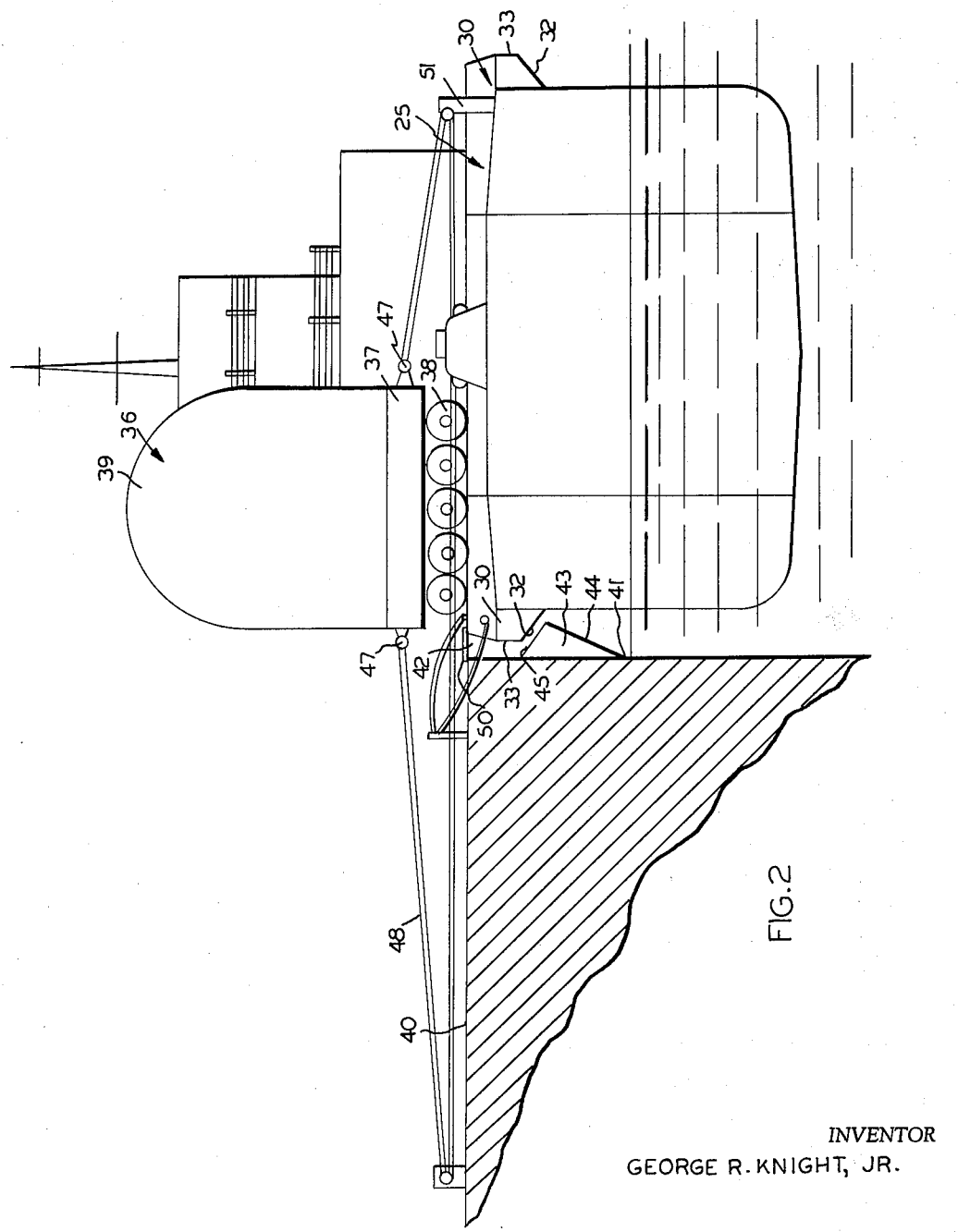
FIGURE 2 is a more or less diagrammatic side view illustrating the method of loading and unloading a large land vehicle upon a ship.

Referring to FIGURE 2 the sponsons 30 having an upwardly and outwardly inclined bottom 32, a substantially vertically extending side 33 and a horizontal top. A purpose of the sponson is to increase the width of the platform so more or larger land vehicles can be carried thereon and to enable the land vehicles to be easily loaded and unloaded from the platform 26. The main deck 24 is provided with the usual cable and drum winches 34 which winches are disposed along the center line of the ship and adjacent the forward and rear ends of the platform 26. Deck 24 is also provided with block members 51.

The land vehicle or trailer 36 is provided with a horizontal bed or platform 37 with a set of wheels 38 mounted therebelow adjacent the front and rear end of the bed and carried by a rotatable frame or turntable member 39. The land vehicle 36 is of conventional structure and is well known. The sets of wheels 38 are secured to the platform 37 through the rotatable table means 39 so that they can be rotated from a position extending parallel to the longitudinal axis of the trailer platform through 90°, to a transverse position disposed at a 90° angle with the longitudinal platform, as shown in FIGURE 1. A truck tractor of common and standard design not shown pulls the trailer along the dock or pier and adjacent side of the ship and the wheels are thereafter rotated 90° so as to enable side loading and unloading of the trailer upon the ship platform.

The missile or vehicle disposed on the trailer platform 37 is encased within a plastic cocoon or covering 39 made of polyethylene and the like or any other flexible material which may be filled with air or an inert or reducing gas under pressure so as to completely enclose the vehicle from the time it leaves the factory until the time it is ready to be launched from the launching site.

Referring to FIGURES 2 and 3 a pier or dockside 40 having a horizontal loading platform or top and the usual vertical side 41 extending below the water level is provided with a recess 42 formed by a horizontally extending member 43. The member 43 is triangular shaped in cross-section and has an upwardly and outwardly extending side 44 on the bottom thereof and a downwardly and outwardly extending side 45 on the top thereof. The member 43 is fixedly secured to the vertical side 41 of the dock or pier and the side 45 is disposed to extend parallel to the underside 32 of the sponson 30 when the ship is properly trimmed. The projecting member 43 is disposed vertically of the side 41 of the pier so that the ship platform 26 is substantially at the same level as the horizontal top portion of the pier 40 when the land vehicle 36 is to be loaded and unloaded from the ship, at which time the lower side of the sponson 30 is supported on the upper side 45 of the member 43 and a portion of the ship's weight taken by it.

The trailer platform 37 is provided with connecting means 47 adjacent the front end and rear ends thereof on opposite sides thereof for connecting the winch cables 48 thereto while the pier is provided with block members 49 for carrying the cables 48 during the loading and unloading of the land vehicles on the ship. The block members 49 are fixedly connected to the pier so as to be stationary.

In loading a land vehicle 36 upon the platform 26 of the ship, the ship is first brought along side the dock in alignment with the member 43 secured to the side of the dock, and is trimmed level and floating with its stowage platform 26 slightly above the level of the dock. The ship is longitudinally trimmed by proper ballasting of liquid in the starboard and port tanks of the vessel. In the use of the well known T2 type tanker ship, filling the port and starboard side tanks 12 through 17 generally provides the proper trim longitudinally and proper immersion when the ship is disposed close to the dock. It has been generally found to be sufficient to pump ballast into the center tanks of 15 and 16 to bring the sponson of the vessel into the recess 42 of the pier so that a portion of the ship's weight will be taken by the member 43 by bottom 32 of the sponson contacting, abutting and seating on the top side 45 of the member 43. The vessel is then securely moored and made fast to the pier by using conventional fast acting drum winches similar to those used in making up barge tows on the inland rivers. These mooring lines, not shown, will also prevent the sponson from lifting out of the pier recess and out of contact with the member 43, should the vessel rise with relation to the pier. At this time, the level of the stowage platform 26 will coincide with the top or horizontal level of the pier 40 and the ship will be made fast to the pier in such a way that it will rotate about its sponson 30 in response to any changes of weight and buoyant forces, rather than vertically rising or falling with relation to the pier. This eliminates any possibility of significant misalignment of the platform level 26 and the horizontal or loading level of the pier.

The land vehicle 37 is then drawn along side of the pier in alignment with the platform 26. A longitudinally elongated rectangular brow plate 50, as shown in FIGURES 2 and 3, is then disposed across the top of the recess 42 between the pier and platform and properly secured to the pier and the adjacent end of the platform 26 by any well known means. The drum winch cables 48 are then mounted around the pier block members 49 and ship block members 51, as shown in FIGURES 2 and 3, and the free ends thereof are attached to the connector members 47 of the land vehicle. The wheels 38 of the trailer have first, of course, been rotated 90° so that the vehicle may be loaded sideways upon the ship platform. The winches 34 are then operated so as to feed-in the cables 48 that are carried by the block members 49 on the vessel and to feed-out the cables 48 that are carried on the pier block members 49. The direction of movement or feeding of the cables is illustrated by the arrows in FIGURES 2 and 3. With the attachment of the cables to both sides of the land vehicle being loaded, it maintains the heavy land vehicle under positive control at all times and gives a very precise and exact movement thereover.

During the loading operation, water will be pumped into the center tanks 15 and 16 at a rate such as to counteract the buoyant effect of the rising sea-level and the additional sinkage of the ship which the introduction of the cargo trailer would tend to produce. As it is impossible for the level of the loading pier and the stowage platform to change appreciably at their junction, minor variations in the list of the ship will be acceptable. By synchronizing the rate at which the cargo or land vehicle is rolled onto the ship and the rate of pumping, the listing effects of the ship can be eliminated. After the load has been transferred the securing dock lines and wires will be slackened and the vessel allowed to raise upwardly and free of the pier recess.

The procedure to be followed in the case of a falling tide is reversed with the ship arriving alongside the loading pier with the center tanks filled to the required level and pumping out their contents as required to maintain the necessary alignment. It is obvious that the effects of tide, and whether the vessel is being loaded or unloaded are considered during any cargo transfer operation and the most advantageous conditions selected.

If desired, once the land vehicle has been secured on the ship by the usual steel wire lashings and guy wires, the tires may be partially deflated on the trailer platform and the lower chassis of the trailer platform provided with structural members connected to primary ships' structure so that there is no chance of the trailer accidently rolling on the platform.

Figure 6:
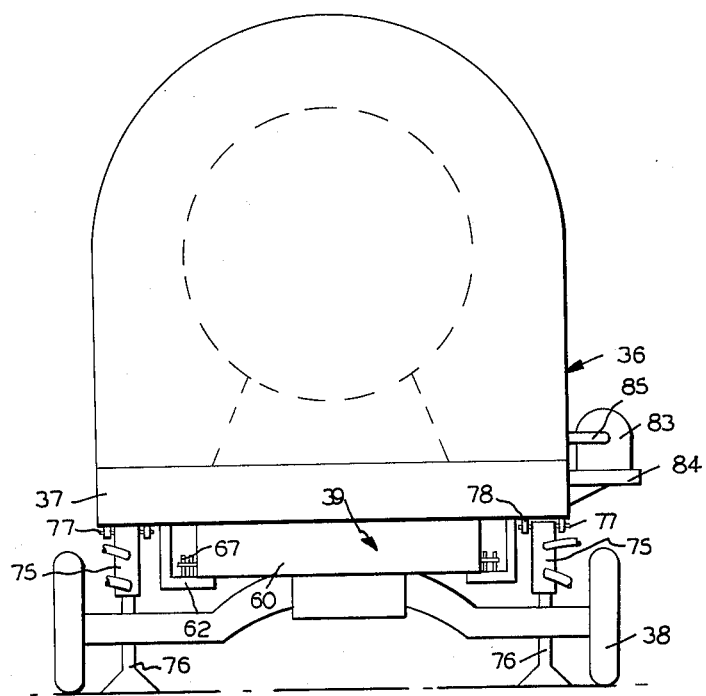
FIGURE 6 is a diagrammatic view of the means for rotating the vehicle wheels 90° to roll it on and off the ship.
Figure 7:
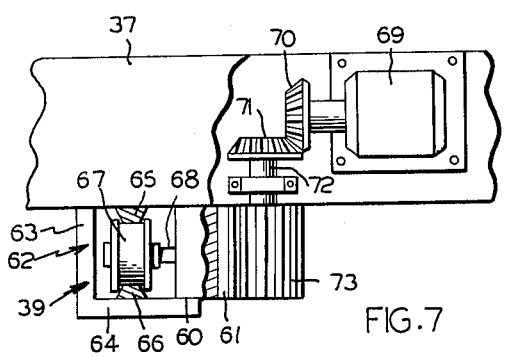
FIGURE 7 is an enlarged fragmentary detail view of the bull ring shown in FIGURE 6.

Referring to FIGURE 6 and 7, the front and rear sets of wheels 38 are fixedly secured to the bull ring gear 60 of the turntable 39 so as to rotate therewith from their normal longitudinal direction or position, to a position at right angles with the longitudinal axis of the trailer bed 37.

Bull ring gear 60 is provided with a plurality of gear teeth 61 disposed on the inner circumference thereof. A circular ring 62 having a vertical section 63 and a horizontal section 64 provide a support member for the rotatable bull gear 60. Two circular or ring members 65 and 66 secured to the trailer bed and section 64 provide tracks or guide paths upon which the roller bearing members 67 of the bull ring 60 rotate or move. Roller bearings 67 are journalled in pin members 68 fixedly secured to the outer circumference of the bull gear. The bull gear is driven by a motor 69 fixed to the trailer bed 37 and a gear wheel 70 which meshes with a gear 71 on stub shaft 72. Shaft 72 which is fixed to the trailer bed has a gear wheel 73 fixed on its lower end which meshes with teeth 61 of the bull gear. The source of power for the motor can be the trailer traction engine which pulls the trailer, or ship's power, whichever is more convenient at the time of operation.

Hydraulic rams or jacks 75 provided with pistons 76 having enlarged lower ends are pivotally secured by pins 77 and lugs 78 to the bottom of the trailer bed. When not in use, the rams can be folded up under the trailer bed and secured thereto by straps or any other well known means.

In order to rotate the wheels 38 at right angles to the longitudinal axis of the trailer bed, the jacks are actuated to lift the wheels clear of the ground, and then the bull gear is driven by motor 69 thereby turning the wheels so the vehicle can be rolled sideways on or off a ship.

Figure 8:
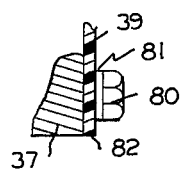
FIGURE 8 is a detail view of the sealing means utilized to maintain the plastic covering of the vehicle air tight.
Figure 9:
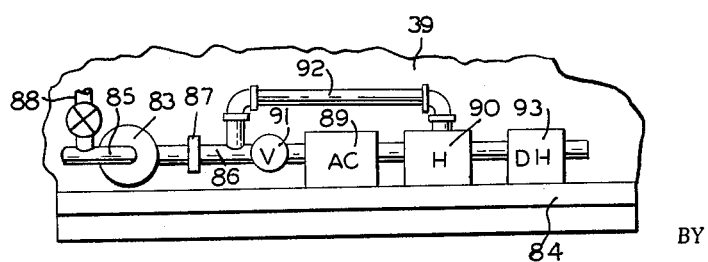
FIGURE 9 is a view of the apparatus used to control the temperature, humidity and air pressure within the plastic covering in which the missile is encased.

Referring to FIGURES 8 and 9 the plastic cocoon or covering 39 is maintained air tight by bolt members 80 threaded through rectangular aluminum strips or sealing members 81 secured to the lower edges 82 of covering 39 and these strips are disposed around the entire perimeter of the trailer bed 37.

The cocoon is inflated with air or other gas and maintained at a pressure above atmospheric by a pump 83 disposed on a support stand 84 secured to the trailer bed 37. Pump 83 has an inlet line 85 and discharge line 86 with a filter 87 therein. An air make-up line 88 is disposed in the suction line 85. The temperature of the air being continuously recirculated through the pump is controlled by an air conditioner 89 if too warm, and by an electrical heater 90 if too cold. A valve 91 and pass line 92 permits the air conditioner 89 to be by-passed therearound to the heater if the air is too cool. A dehumidifier 93 downstream of the heater controls the humidity of the circulated air.

The source of power for the pump, air conditioner, heater and humidifier is either from the ship or trailer traction and preferably it is desired to recirculate approximately 60% of the air in the cocoon with air make up being about 40%.

Thus, from the present invention it is apparent that the invention provides a ship having sponson means extending from both sides thereof which will enable the ship to be drawn alongside a pier and a heavy land vehicle loaded sideways onto each side of the ship.

It is also apparent that the present invention provides a novel arrangement whereby a sponson which overhangs the side of the ship's hull cooperates with a projecting member alongside of a pier so that the ship can be fastened securely thereto and the pier loading level and the ship's loading level be maintained in alignment with each other at all times during loading so that the ship can only rotate, if at all, about its sponson in response to changes of weight and buoyant forces rather than rising or falling vertically with relation to the pier. Thus, this eliminates any possibility of significant misalignment of the two loading levels.

It is also apparent that the present invention provides a novel method of loading and unloading a heavy vehicle from a ship.

It will be realized that many modifications and variations of the present invention are possible in the light of the above teachings. It is therefore to be understood, that within the scope of the appended claims the invention may be practiced otherwise than as specifically described.

What is claimed is:

1. In combination, a pier with a projecting elongated horizontal member disposed on the vertical portion of the pier and forming a recess thereabove, and a tanker ship including a platform for carrying a land vehicle thereon, a sponson member extending beyond the side of the ship's hull, said platform extending beyond the ship's hull and supported by said sponson, said elongated member being disposed vertically on the pier so said sponson fits into said recess and the platform and top of the pier are at substantially the same height when the sponon is in contact with said pier elongated member whereby land vehicles can be loaded and unloaded from said platform, and ballasting means on the ship to bring and/or maintain the sponson member in engagement with the projecting member.

2. The combination of claim 1 wherein said sponson has a upwardly and outwardly inclined bottom portion and a vertical side portion, and said elongated member has a downwardly and outwardly inclined top portion adopted to abut said sponson bottom portion.

3. The combination of claim 2 wherein winch and cable means are provided on said ship and fixed block means are provided on said pier and ship for affixing to a land vehicle to pull it onto and off the ship.

4. The combination of claim 3 wherein a sponson member is disposed on both sides of the ship's hull.

5. The combination of claim 3 wherein brow plate means are provided for spanning said recess.

6. Means for transporting loads of great weight and bulk comprising: in combination, a ship, a land vehicle, and a pier, said ship having a substantially flat main deck portion between the bow and stern, said deck being of sufficient size to accommodate said land vehicle, said deck overhanging the sides of the hull, sponson means supporting said overhanging portion of said main deck, a bridge house located at at least one end of said main deck portion, a plurality of tanks disposed within the hull of said ship for carrying liquid therein and for ballasting said ship to a proper longitudinal and transverse trim, winch and cable means located on said main deck for moving said land vehicle onto and off of said ship, means to secure said land vehicle to said deck, said land vehicle being of sufficient size to accommodate said load, pivotal wheels disposed around the underside of said land vehicle whereby said land vehicle may be drawn up to said ship longitudinally, said wheels pivoted 90°, and said land vehicle pulled laterally onto said ship by said winch and cable means, said pier having a supporting member rigidly fixed to be outwardly extending from a vertical portion of said pier, whereby when the ship is positioned alongside the pier the overhanging portion of the main deck will be in contact with and supported by said supporting member during loading of said land vehicle onto said ship.

7. Means for transporting loads of great weight and bulk comprising: in combination, a ship and a land vehicle, said ship having a substantially flat main deck portion between the bow and stern, said main deck portion overhanging the sides of the hull, sponson means supporting said overhanging portion of said main deck portion, said deck being of sufficient size to accommodate said land vehicle, a bridge house located at at least one end of said main deck portion, a plurality of tanks disposed within the hull of said ship for carrying liquid therein and for ballasting said ship to a proper longitudinal and transverse trim, winch and cable means located on said main deck for moving said land vehicle onto and off of said ship, means to secure said land vehicle to said deck, said land vehicle being of sufficient size to accommodate said load, pivotal wheels disposed around the underside of said land vehicle, a pier and a member projecting therefrom which underlies and supports the sponson means during the loading and unloading operation whereby said land vehicle may be drawn up to said said ship longitudinally, said wheels pivoted 90 degrees, and said land vehicle pulled laterally onto said ship by said winch and cable means.

References Cited by the Examiner

UNITED STATES PATENTS

| | | | |
|---|---|---|---|
| 701,053 | 5/1902 | Killebrew | 214—14 |
| 985,371 | 2/1911 | Roeth et al. | 61—48 |
| 1,154,133 | 9/1915 | Seltzer | 114—231 |
| 1,341,197 | 5/1920 | Reynolds | 214—38.22 |
| 1,799,874 | 4/1931 | Taylor | 114—85 |
| 1,900,867 | 3/1933 | Olds | 214—152 |
| 1,993,481 | 3/1935 | Kellett. | |
| 2,004,095 | 6/1935 | Hankins et al. | 214—517 X |
| 2,247,144 | 6/1941 | Baldwin | 214—14 |
| 2,409,870 | 10/1946 | Kinnaird | 214—38.22 |
| 2,451,198 | 10/1948 | Burke | 214—14 |
| 2,503,210 | 4/1950 | O'Halloran | 214—152 |
| 2,503,603 | 4/1950 | Wiley | 114—85 |
| 2,576,928 | 12/1951 | Engstrand | 114—43.5 X |
| 2,669,210 | 2/1954 | Bernhard | 214—15 X |
| 3,114,244 | 12/1963 | Silver | 61—49 |

FOREIGN PATENTS 547,324  3/1932  Germany.

GERALD M. FORLENZA, *Primary Examiner.*

HUGO O. SCHULZ, *Examiner.*